(12) United States Patent
Nakashima et al.

(10) Patent No.: US 7,474,199 B2
(45) Date of Patent: Jan. 6, 2009

(54) IN-VEHICLE DEVICE REMOTE CONTROL SYSTEM

(75) Inventors: Kazuhiro Nakashima, Kariya (JP); Kentarou Teshima, Kariya (JP); Kenichi Ogino, Toyota (JP)

(73) Assignee: Denso Corporation (JP)

( * ) Notice: Subject to any disclaimer, the term of this patent is extended or adjusted under 35 U.S.C. 154(b) by 95 days.

(21) Appl. No.: 11/797,557

(22) Filed: May 4, 2007

(65) Prior Publication Data

US 2007/0229219 A1 Oct. 4, 2007

(30) Foreign Application Priority Data

Jun. 30, 2006 (JP) ............................. 2006-182075

(51) Int. Cl.
*B60R 25/10* (2006.01)
(52) U.S. Cl. ............... 340/426.1; 340/539.32; 340/539.1; 340/426.1; 340/426.16; 340/539.11; 340/10.3; 340/10.5; 340/10.1; 701/2; 701/49
(58) Field of Classification Search ............ 340/539.32, 340/539.1, 425.5, 426.1, 426.16, 426.17, 340/426.18, 539.11, 10.3, 10.5, 10.1, 5.72; 307/10.2, 10.3; 701/2, 49, 36
See application file for complete search history.

(56) References Cited

U.S. PATENT DOCUMENTS

| | | | | |
|---|---|---|---|---|
| 5,563,453 A * | 10/1996 | Nyfelt ..................... 307/10.2 |
| 5,602,535 A * | 2/1997 | Boyles et al. .............. 340/5.22 |
| 5,619,191 A * | 4/1997 | Lambropoulos et al. ... 340/5.22 |
| 5,896,094 A * | 4/1999 | Narisada et al. ............ 340/5.64 |
| 6,744,364 B2 * | 6/2004 | Wathen ................... 340/539.1 |
| 7,400,243 B2 * | 7/2008 | Sumida et al. ......... 340/539.11 |
| 2005/0242923 A1 * | 11/2005 | Pearson et al. ............. 340/5.62 |
| 2006/0186993 A1 * | 8/2006 | Inoue ........................ 340/5.72 |
| 2007/0040650 A1 * | 2/2007 | Handley et al. ............ 340/5.64 |
| 2007/0229219 A1 * | 10/2007 | Nakashima et al. ........ 340/5.61 |

FOREIGN PATENT DOCUMENTS

JP 2000-104429 4/2000

* cited by examiner

*Primary Examiner*—Daryl C Pope
(74) *Attorney, Agent, or Firm*—Nixon & Vanderhye PC

(57) ABSTRACT

An in-vehicle device remote control system includes a vehicle-side device, a main mobile device that returns a first response signal in response to a request signal transmitted from the vehicle-side device, and a sub-mobile device that returns a second response signal in response to the request signal. When the vehicle-side device receives the response signal, it conducts a matching process. Vehicle doors are unlocked automatically when the received response signal is determined to be either the first or the second response signal. On the other hand, the engine start is permitted only when the received signal is determined to be the first response signal.

11 Claims, 5 Drawing Sheets

IN-VEHICLE DEVICE REMOTE CONTROL SYSTEM

CROSS REFERENCE TO RELATED APPLICATION

This application is based on and incorporates herein by reference Japanese Patent Application No. 2006-182075 filed on Jun. 30, 2006.

FIELD OF THE INVENTION

The present invention relates to an in-vehicle device remote control system, and more particularly to a system having a function of conducting a bidirectional communication between a vehicle-side device and a mobile device.

BACKGROUND OF THE INVENTION

A conventional system that remotely controls an in-vehicle device conducts a bidirectional communication between the vehicle-side device and a mobile device such as an electronic key device to determine whether the mobile device is a regular or authorized mobile device carried by a user, as disclosed in, for example, JP 2000-104429A. This remote control system is a smart key system, and has a transmitter as the vehicle-side device so as to conduct the bidirectional communication between the transmitter and the mobile device.

A transmission request signal is transmitted to a given detection area from the transmitter. When the mobile device exists within the detection area to which the transmission request signal has been transmitted, the transmission request signal is received by the mobile device. The mobile device responsively transmits a given response signal in response to the transmission request signal. The response signal is received by a receiver equipped in the vehicle, and a given matching process is conducted on the response signal by a vehicle-side device. When the matching is confirmed, it is determined that the mobile device that has transmitted the response signal is an authorized mobile device. As a result, doors are unlocked, or an engine start is permitted based on the determination result.

In many instances, a plurality of mobile devices are provided to the owner of the vehicle so that not only the owner but also other persons such as the owner's family members may use the vehicle. Even if the mobile devices are different from each other, the control to be executed is identical if the mobile devices are the authorized devices. This is advantageous in that it is unnecessary for the user to be aware of which one of the mobile devices the user carries.

When a child is made to first get on the vehicle, it may be necessary to give the child the mobile device. However, when only the child having the mobile device exists within the vehicle, the child may erroneously starts the engine, and the vehicle moves in a state where only the child is in the vehicle. In order to prevent this situation, it is necessary to give the child no mobile device. However, this may cause some inconveniences in allowing the child first to get on the vehicle.

SUMMARY OF THE INVENTION

An object of the present invention is to provide an in-vehicle device remote control system which is capable of making a person such as a child, who is incapable of driving a vehicle, first gets on the vehicle while preventing that the vehicle is moved erroneously by such a person.

According to one aspect, an in-vehicle device remote control system includes a vehicle-side device and first and second mobile devices. The vehicle-side device is mounted in a vehicle and includes a transmitter, a receiver and a control unit. The transmitter transmits a transmission request signal to given detection areas outside of and inside of the vehicle. In response to the transmission request signal, the first mobile device transmits a first response signal and the second mobile device transmits a second response signal different from the first response signal. The receiver receives the response signals of the mobile devices. The control unit executes a given matching process with respect to the response signals received by the receiver, and determines a detection area in which the mobile device is present based on the response signal received by the receiver. The control unit controls doors of the vehicle based on the response signal and a position of the mobile device in the detection area outside of the vehicle, and controls an engine of the vehicle based on the response signal and a position of the mobile device in a given start-permitting detection area inside the vehicle. The control unit unlocks the doors automatically in response to any of the first response signal or the second response signal, and permits a start of the engine in response to only the first response signal.

BRIEF DESCRIPTION OF THE DRAWINGS

The above and other objects, features and advantages of the present invention will become more apparent from the following detailed description made with reference to the accompanying drawings.

In the drawings.

DETAILED DESCRIPTION OF THE PREFERRED EMBODIMENTS

Figure 1:
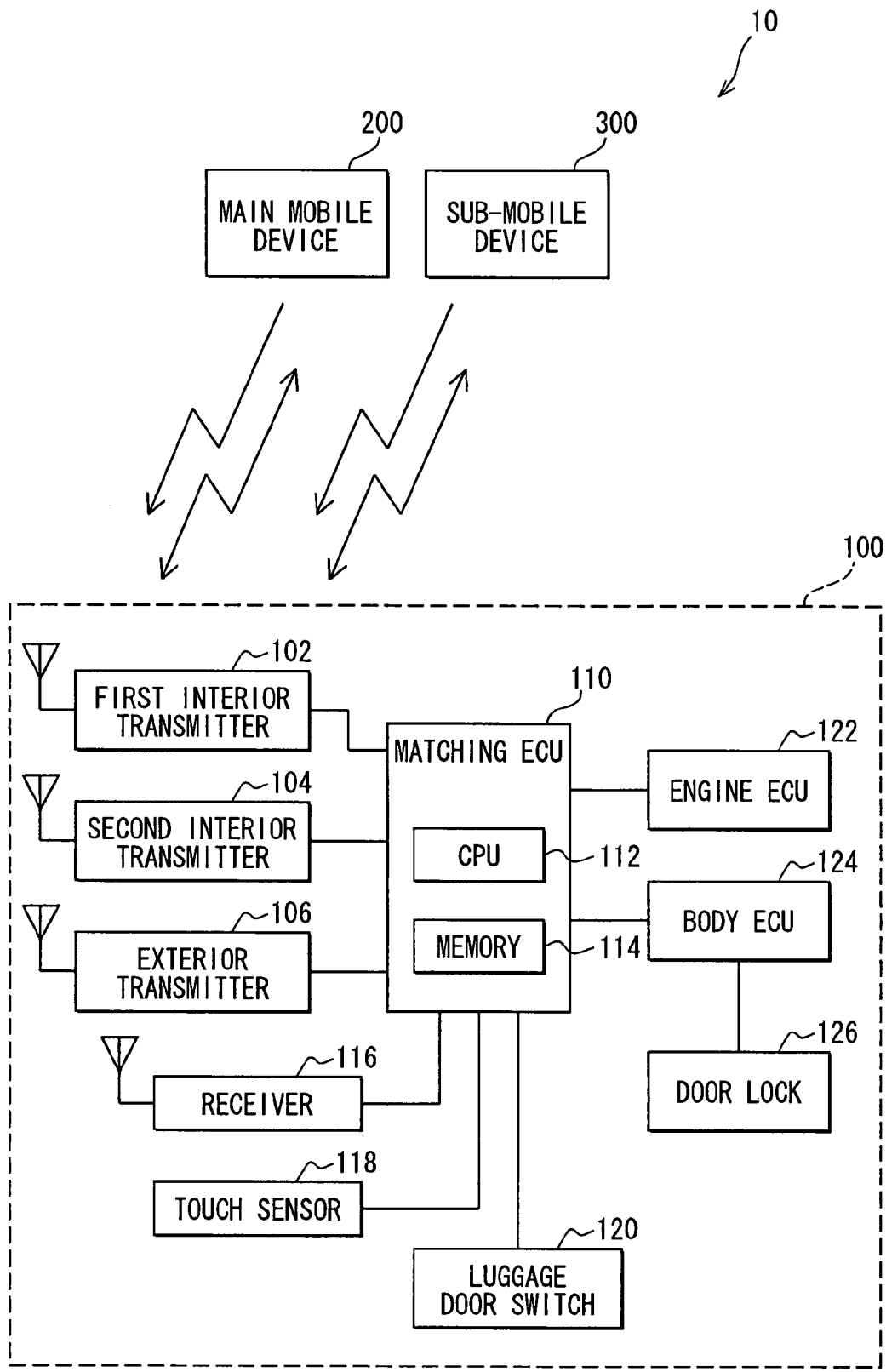
FIG. 1 is a block diagram showing an in-vehicle device remote control system according to an embodiment of the present invention.

Referring first to FIG. 1, an in-vehicle device remote control system 10 includes a vehicle-side device 100, a main mobile device 200 provided as a first mobile device, and a sub-mobile device 300 provided as a second mobile device. The mobile devices 200 and 300 may be electronic key devices carried by users and capable of radio communication with the vehicle-side device 100.

The vehicle-side device 100 has a first vehicle interior transmitter 102, a second vehicle interior transmitter 104, and a vehicle exterior transmitter 106. The first vehicle interior transmitter 102 is disposed in the periphery of front seats in a vehicle interior, and forms a detection area that detects the keys 200 and 300 to include the front seats (that is, a driver seat and a passenger seat) in the vehicle interior, but not to include other seats. The second vehicle interior transmitter 104 is disposed in the periphery of rear seats in the vehicle interior, and forms a detection area that detects the keys 200 and 300 to include all of the seats other than the front seats in the vehicle interior.

Figure 2:
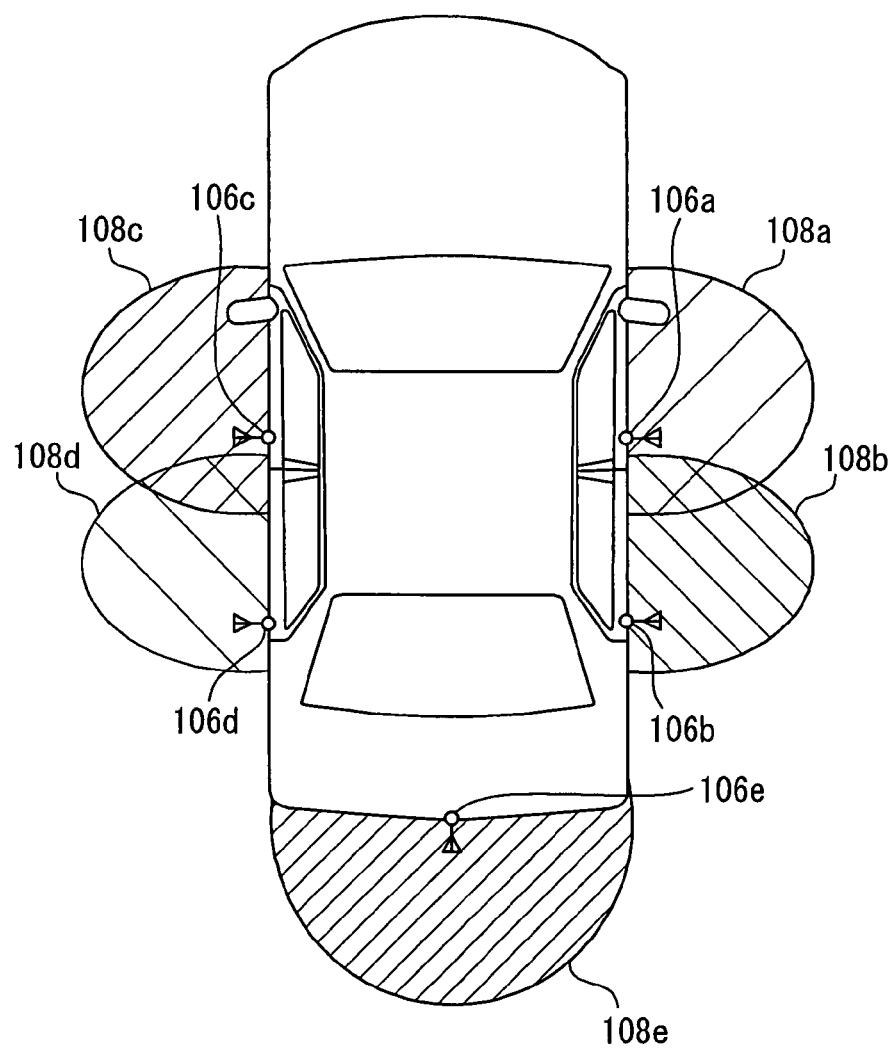
FIG. 2 is a schematic diagram showing the positions of vehicle exterior transmitters and detection areas that are formed by the vehicle exterior transmitters.

The vehicle exterior transmitter 106 has first to fifth vehicle exterior transmitters 106a to 106e in this embodiment, as shown in FIG. 2. The first vehicle exterior transmitter 106a is disposed at a right front seat door (D seat door) or in the vicinity of the D seat door, and forms a first detection area 108a on a right side of the D seat door (outside of the vehicle in the vehicle width direction). The second vehicle exterior transmitter 106b is disposed at a right rear seat door (RR seat door) or in the vicinity of the RR seat door, and forms a second detection area 108b on a right side of the RR seat door. The third vehicle exterior transmitter 106c is disposed at a left front seat door (P seat door) or in the vicinity of the P seat door, and forms a third detection area 108c on a left side of the P seat door. The fourth vehicle exterior transmitter 106d is disposed at a left rear seat door (LR seat door) or in the vicinity of the LR seat door, and forms a fourth detection area 108d on a left side of the LR seat door. The fifth vehicle exterior transmitter 106e is disposed at a luggage door or in the vicinity of the luggage door, and forms a fifth detection area 108e in the rear of the luggage door. The detection areas 108a to 108e are, for example, about 0.7 to 1.0 m in radius from the vehicle exterior transmitters 106a to 106e, respectively.

The vehicle-side device 100 further has a matching electronic control unit (ECU) 110, which includes a central processing unit (CPU) 112 and a memory 114. The CPU 112 executes various processing according to program that is stored in the memory 114. For example, when the vehicle is parked and the doors are locked, the CPU 112 outputs a request signal that is a transmission request signal to those five vehicle exterior transmitters 106a to 106e in order every given period that is set to a short period of time such as about 0.3 seconds. Also, when an engine starter switch (not shown) is operated, the CPU 112 outputs the request signal to the vehicle interior transmitters 102 and 104 in order. When the request signal is supplied to the transmitters 102 to 106, the transmitters 102 to 106 transmit the respective request signals in sequence. The request signals define the corresponding detection areas 108a to 108e, respectively.

When the request signal is transmitted and the key 200 or 300 is present in the detection area defined by the request signal, a response signal that is a response signal is returned from the key 200 or 300. A receiver 116 is provided to receive the response signal, and is located at a given position of the interior of the vehicle. Then, the response signal received by the receiver 116 is output to the matching ECU 110.

Since the CPU 112 outputs the request signals to those transmitters 102, 104 and 106 in order at time points different from each other, it is possible to determine from which detection area the response signal has been transmitted, that is, in which detection area the key 200 or 300 are present, by determining when the response signal has been supplied.

Touch sensors 118 are disposed on door outside handles of entrance doors (D seat door, P seat door, RR seat door, LR seat door for seating passengers on the seats), respectively. Each of the touch sensors 118 detects that the user touches the corresponding handle, and then supplies to the matching ECU 110 a signal indicative of user's touching. A luggage door switch 120 is a switch that is operated by the user when opening the luggage door. The luggage door switch 120 is so positioned as to be exposed to the outside of the vehicle on the luggage door. Then, when the luggage door switch 120 is operated by the user to open the luggage door, a signal indicative of this user's operation is supplied to the matching ECU 110.

An engine ECU 122 is provided to control an engine that may be a motor, and connected to the matching ECU 110 by way of an in-vehicle LAN so as to transmit or receive a signal with respect to the matching ECU 1,10. The engine ECU 122 executes various controls of the engine when the engine start is permitted by the matching ECU 110.

Similarly, a body ECU 124 is connected to the matching ECU 110 by way of the in-vehicle LAN so as to transmit or receive a signal with respect to the matching ECU 110. The body ECU 124 controls a door lock mechanism 126 based on a signal from the matching ECU 110. The door lock mechanism 126 unlocks the entrance doors and the luggage door, thereby making the entrance doors and the luggage door in an unlock condition. The door lock mechanism 126 is one of in-vehicle devices.

Figure 3A:
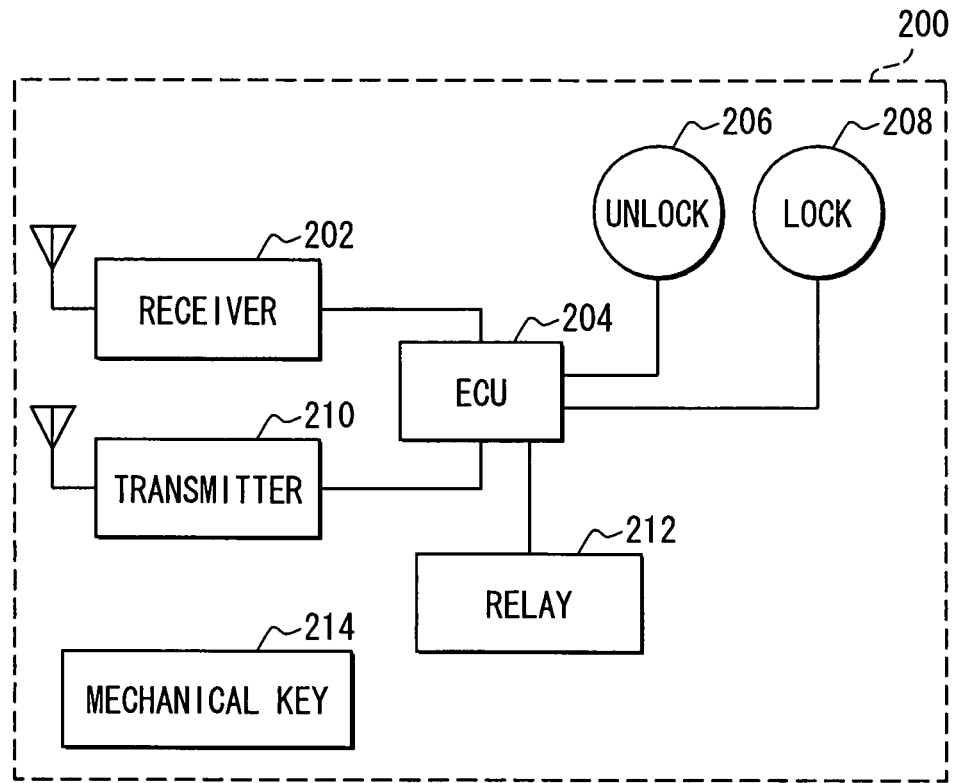
FIG. 3A is a block diagram showing a main mobile device.

The main mobile device 200 is constructed as shown in FIG. 3A. A receiver 202 of a receiving section is provided to receive the request signals that are transmitted from the transmitters 102 to 106, and outputs the received request signals to an ECU 204. An unlock switch 206 and a lock switch 208 are provided to be operated when the user instructs the transmission of a door unlock signal and a door lock signal, respectively. When those switches 206 and 208 are operated by the user, those signals are output to the ECU 204.

The unlock switch 206 also functions as a control change switch for stopping or restarting the door lock control function based on the transmission of the request signal from the vehicle side and the response signal from the key 200 or 300. In a given vehicle state where the engine switch is in the OFF state, the D seat door is closed, and the D seat door is unlocked, the unlock switch 206 is operated to transmit the unlock signal, thereby enabling the control contents of the door lock control function to change.

When the request signal of the vehicle-side device 100 received by the receiver 202 is supplied to the ECU 204, the ECU 204 generates a first response signal including a first ID code to output the first response signal to a transmitter 204 of a transmitting section. Also, when the signals from the unlock switch 206 and the lock switch 208 are input to the ECU 204, the ECU 204 outputs the unlock signal or the lock signal to the transmitter 204. The transmitter 210 transmits a signal that is supplied from the ECU 204. The receiver 202, the ECU 204 and the transmitter 210 are operated by receiving power supply from a built-in battery (not shown). The receiver 202, the ECU 204, and the transmitter 210 are not operable when the battery runs down.

A relay 212 does not require the power supply from the battery, but operates with radio waves that are transmitted from the transmitters of the vehicle as a power supply. Then, the relay 212 transmits the radio wave including the first response signal to the vehicle. The transmitters of the vehicle are disposed in the vicinity of an engine start switch (not shown). The relay 212 generates electric power to make the main mobile device 200 operable, when the main mobile device 200 is brought close to the engine start switch.

The main mobile device 200 is provided with a built-in mechanical key 214. The mechanical key 214 can be fitted into a door key cylinder of the D seat door. The door can be unlocked or locked, when the mechanical key 214 is inserted into the door lock key cylinder and rotationally operated in the key cylinder in the conventional manner.

Figure 3B:
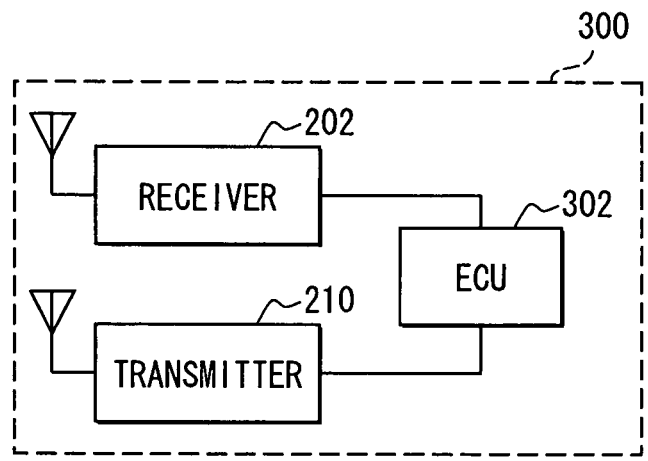
FIG. 3B is a block diagram showing a sub-mobile device.

The sub-mobile device 300 is constructed as shown in FIG. 3B. The sub-mobile device 300 includes a receiver 202 and a transmitter 210 which are similar to those of the main mobile device 200, and an ECU 302 for controlling the receiver 202 and the transmitter 210. However, unlike the main mobile device 200, the sub-mobile device 300 does not have the unlock switch 206, the lock switch 208, the relay 212, and the mechanical key 214. Since the sub-mobile device 300 does not have those parts 206, 208, 212, and 214, the sub-mobile device 300 can be manufactured at low costs. Also, it is possible to easily manufacture the sub-mobile device 300 in various configurations such as a necklace type, a bracelet type, or a key holder type. When the request signal received by the receiver 202 is supplied to the ECU 302, the ECU 302 generates a second response signal having a second ID code that is different from the first ID code to output the second response signal to the transmitter 210.

Figure 4:
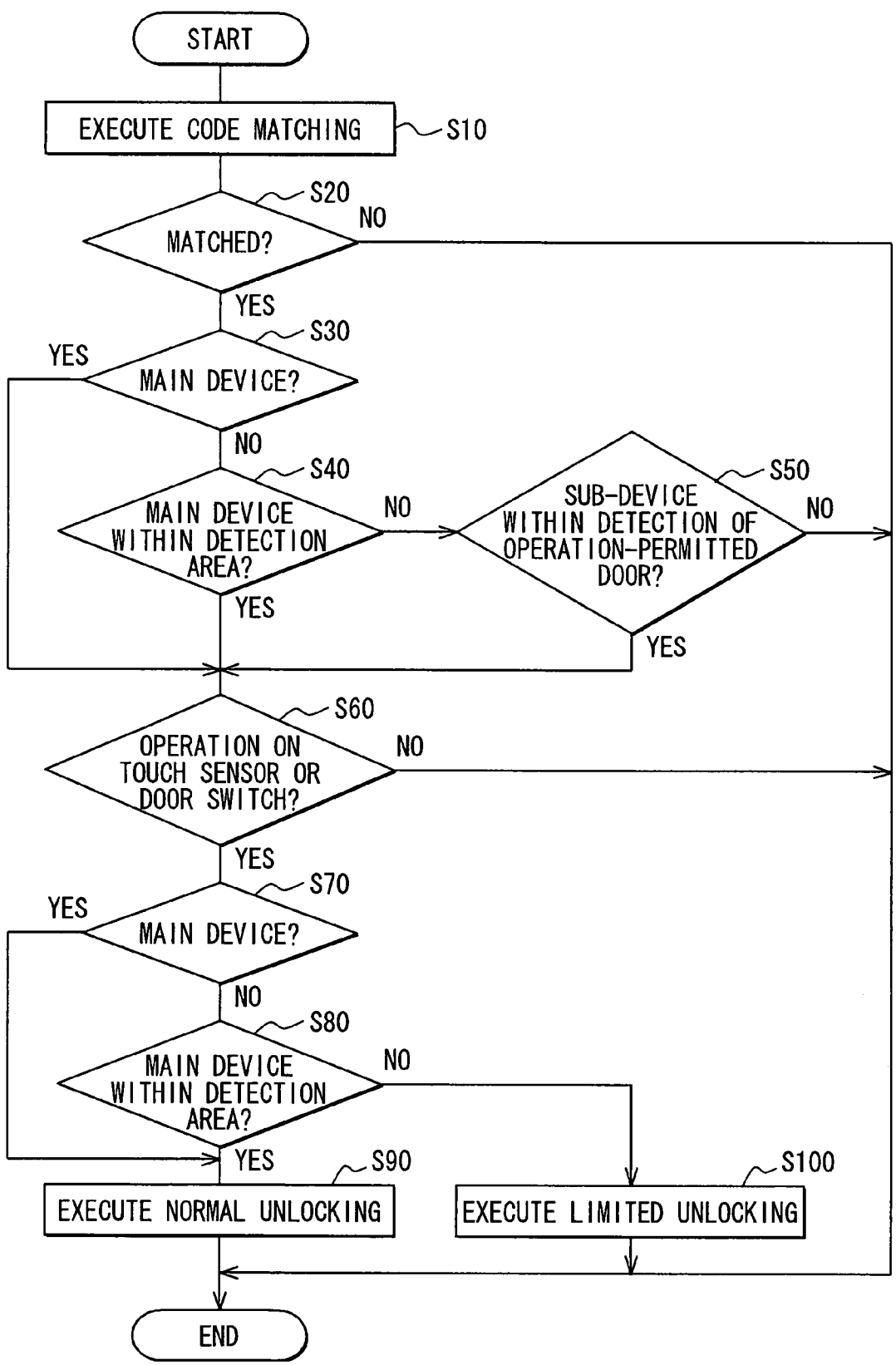
FIG. 4 is a flowchart showing a process executed by a CPU when a response signal is supplied to a matching ECU in a state where a vehicle is parked and doors are locked.
Figure 5:
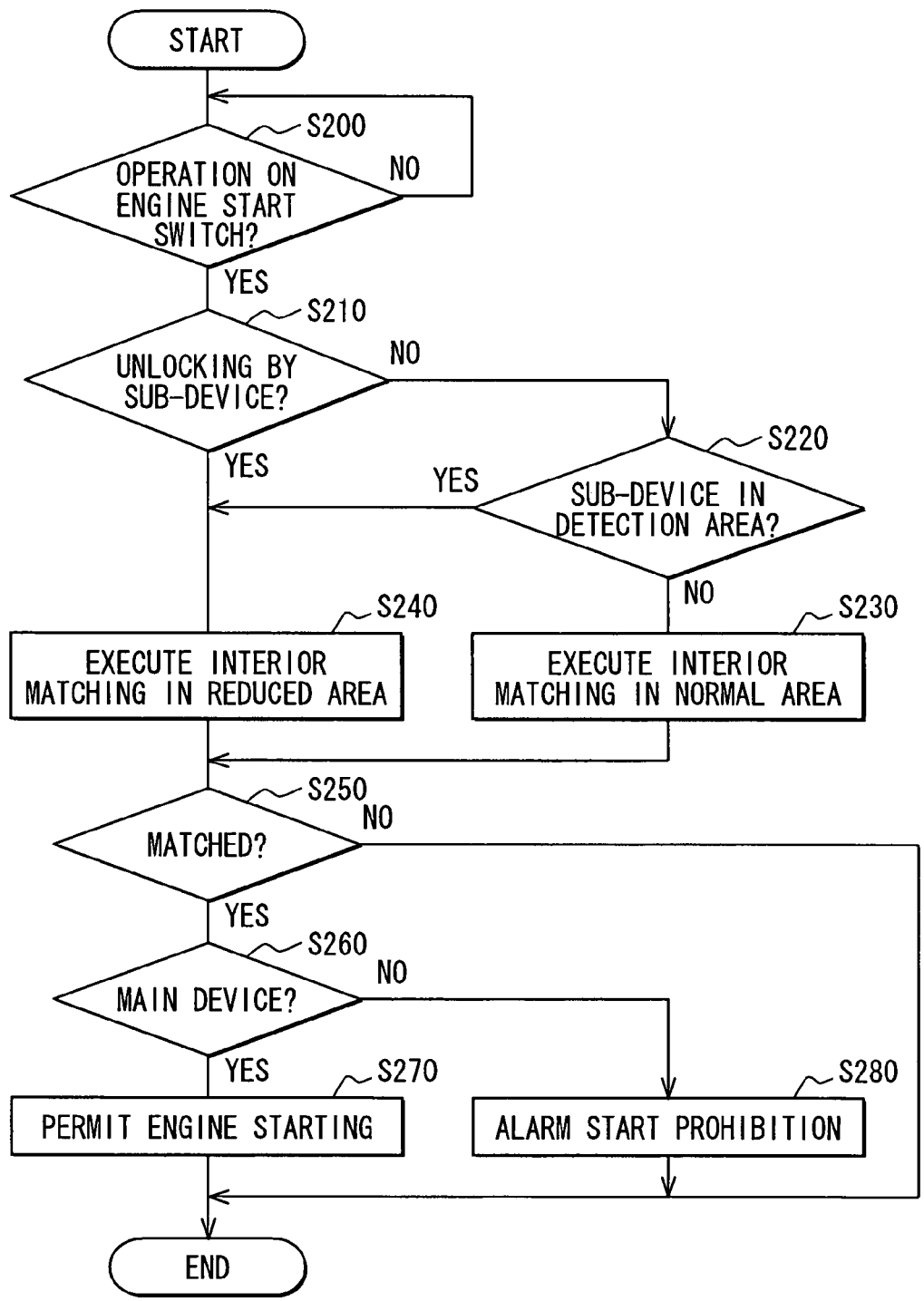
FIG. 5 is a flowchart showing a process of permitting an engine start which is executed by the CPU.

The matching ECU 110, particularly its CPU 112, executes processes shown in FIGS. 4 and 5.

The process shown in FIG. 4 is executed when the response signal of the portable device 200 or 300 is received by the receiver 116 and supplied to the matching ECU 110 in a state where the vehicle is parked, and the doors are locked.

At step S10, a given matching process is executed with respect to a code that is included in the received response signal. The matching process determines whether the ID code that is included in the response signal corresponds to a mobile device that is registered in advance or not. In this embodiment, it is assumed that the first response signal that is transmitted from the main mobile device 200 and the second response signal that is transmitted from the sub-mobile device 300 are registered.

In subsequent step S20, it is checked whether the ID code is matched (registered code) or not. When the received signal is neither the first response signal nor the second response signal, this routine is terminated. On the other hand, when the received signal is the first response signal or the second response signal, step S30 is executed. Here, since steps S10 and S20 are executed when the CPU 112 receives the response signal responsive to the request signal that is transmitted from the vehicle exterior transmitter 106, it is possible to determine that the mobile device 200 or 300 that transmitted the response signal is positioned in the detection area outside of the vehicle. For this reason, step S20 also functions to determining a position of the mobile device.

In subsequent step S30, it is checked whether the mobile device whose matching is accepted at step S20 is the main mobile device 200 or not. When the determination is affirmative, the process at step S60 is immediately executed. On the other hand, when the determination is negative, that is, when the mobile device whose matching is accepted is the sub-mobile device 300, the control is advanced to step S40.

Step S40 also operates as the position detecting section. It is checked whether the main mobile device 200 can be detected in the detection area of the vehicle exterior transmitter 106 or the detection area of the vehicle interior transmitters 102 and 104. When the process of step S40 is executed in order to conduct the determination of step S40, the request signals may be transmitted from the vehicle interior transmitters 102, 104 and the vehicle exterior transmitter 106 at timings different from each other. Thereafter, when the first response signal is received by the receiver 116, the determination at step S40 is affirmative. The determination of whether the main mobile device 200 is present in the vehicle exterior or not may be conducted based on the request signal that is periodically transmitted from the vehicle exterior transmitter 106 when the vehicle is parked.

When the determination of step S40 is affirmative, the control is advanced to step S60 as when it is determined at step S30 that the main mobile device 200 is detected at step S30. On the other hand, when the determination is negative, that is, when the main mobile device 200 has not been detected, the control is advanced to step S50. Here, it is checked whether the detection area of the sub-mobile device 300 in which it is determined at step S20 that the matching can be conducted is a detection area of the operation-permitted door or not. The operation-permitted door is set in a part or all of the D seat door, the RR seat door, the P seat door, the LR seat door and the luggage door in advance. The detection area of the operation-permitted door is a detection area that is set adjacent to the respective operation-permitted door.

The operation-permitted door among the various doors may be set and changed based on the signal that is transmitted from the main mobile device 200. The change cannot be made by the signal that is transmitted from the sub-mobile device 300.

When the determination at step S50 is affirmative, the control is advanced to step S60. At step S60, it is checked whether the sensor 118 or the switch 120 which are set in the unlock-permitting switch has been operated for door opening or not within a given period of time after it is determined that the matching is confirmed at step S20.

Any of the touch sensors 118 and the luggage door switch 120 may be set as the unlock-permitting switch separately for the main mobile device 200 and the sub-mobile device 300. However, the unlock-permitting switch for the sub-mobile device 300 is limited to be only a part of the unlock-permitting switches for the main mobile device 200, for example, only the sensor 118 and the switch 120 which are disposed in the operation-permitted door. Also, the setting of the unlock-permitting switch may be changed based on a signal from the main mobile device 200, but may not be changed based on a signal from the sub-mobile device 300.

When the determination at step S60 is affirmative, the processing at step S70 and subsequent steps is executed, to thereby unlock at least one door. On the other hand, when the determination at step S60 is negative, this routine is terminated without unlocking the door. Also, when it is determined that the sub-mobile device 300 is not in the detection area of the operation-permitted door at step S50, this routine is terminated without unlocking the door.

At step S70, it is checked whether the mobile device whose matching is confirmed at step S20 is the main mobile device 200 or not. When the determination is affirmative, step S90 is executed. On the other hand, when the determination is negative, that is, when the mobile device whose matching is accepted is the sub-mobile device 300, the control is advanced to step S80.

Step S80 also operates as a position detecting section, checks whether the main mobile device 200 can be detected in the detection area of the vehicle exterior transmitter 106 or the detection areas of the vehicle interior transmitters 102 and 104 or not. Since the determination of step S80 is similar to step S40, the determination result of step S40 can be used. Also, the request signal may be again transmitted from the vehicle interior transmitters 102, 104 and the vehicle exterior transmitter 106 at timings different from each other.

When the determination at step S80 is affirmative, the control is advanced to step S90, and the predetermined normal unlocking operation is executed automatically. For example, if the operation of unlocking all of the entrance doors is set as the normal unlocking operation, the process of step S90 is executed to thereby unlock all of the entrance doors.

On the other hand, when the determination at step S80 is negative, the control is advanced to step S100, and the predetermined limited unlocking operation is executed. The limited unlocking operation is set to be the unlocking of only a part of doors. For example, the operation of this limited unlocking may be executed only for the RR seat door or the LR seat door, which is usually used for children, and whose touch sensor 118 has been touched.

Thus, steps S90 and S100 operate as door control section. Which door is unlocked in the normal unlocking operation, and which door is unlocked in the limited unlocking operation may be changed based on only the signal that is transmitted from the main mobile device 200, but not the signal that is transmitted from the sub-mobile device 300.

After the above unlocking control, a process of permitting engine start is executed in a given repetitive period as shown in FIG. 5.

At step S200, it is checked whether the operation of the engine start switch is detected or not. When the determination is negative, the process at step S200 is repeatedly executed.

On the other hand, when the determination is affirmative, the control is advanced to step S210. At step S210, it is checked whether the mobile device that is used in the unlocking operation, that is, the mobile device whose matching is confirmed at step S20 of FIG. 4 is the sub-mobile device 300 or not. When the determination is affirmative, the control is advanced to step S240. On the other hand, when the determination at step S210 is negative, the control is advanced to step S220.

The process of step S200 operates as the position detection section, which determines whether the sub-mobile device 300 is detected in the vehicle interior or not. The determination can be conducted by using the result of executing the process in FIG. 4. Alternatively, it is possible to again transmit the request signals from the vehicle interior transmitters 102 and 104 at timings different from each other, and conduct the determination of step S220 depending on the second response signal being received by the receiver 116 or not.

When the determination at step S220 is negative, that is, when the key used in the unlocking operation is not the sub-mobile device 300, and the sub-mobile device 300 is not detected, the control is advanced to step S230.

At step S230, interior matching is executed in a normal area in the vehicle by transmitting the request signals in the normal area. The normal area may be set to a start-permitting area for permitting the engine starting. In this embodiment, the entire vehicle interior is set to be the normal area, and both the first vehicle interior transmitter 102 and the second vehicle interior transmitter 104 are instructed to transmit the request signals sequentially.

When the determination at step S210 or step S220 is affirmative, that is, when the door is unlocked by the sub-mobile device 300 or the sub-mobile device 300 is detected, the control is advanced to step S240. At step S240, the interior matching is executed in a reduced area in the vehicle by transmitting the request signals in the reduced area. The reduced area is set to an area smaller than the normal area as the start-permitting area. In this embodiment, the detection area of the first vehicle interior transmitter 102 is set in the reduced area, and only the first vehicle interior transmitter 102 is instructed to transmit the request signal.

After the process at step S230 or step S240, the control is advanced to step S250. It is checked whether the matching is confirmed or not. When the response signal is not received within a given period of time after the request signal has been transmitted at steps S230 and S240, the determination at step S250 is negative. On the other hand, when the response signal is received, a given matching process is executed. Accordingly, the process at step S250 also operates as the matching section. As a result of matching, even when the ID code that is included in the response signal does not correspond to the mobile device registered in advance, the determination at step S250 is negative. When the determination at step S250 is negative, this routine is terminated and engine starting is prohibited.

When the determination at step S250 is affirmative, that is, when the matching is confirmed, the control is advanced to step S260. It is further checked here whether the mobile device whose matching is confirmed is the main mobile device 200 or not. When the determination is affirmative, the engine start permission signal is output to the engine ECU 122 at step S270. The engine ECU 122 that receives the engine start permission signal thus starts the engine.

When the determination at step S260 is negative, that is, when the key whose matching is confirmed is the sub-mobile device 300, the control is advanced to step S280. In this case, an alarm is issued from a speaker (not shown) to indicate that the engine starting is prohibited because of the sub-mobile device 300. The processes at step S S270 and S280 operate as an engine or motor control section.

As described above, according to this embodiment, the doors are unlocked and the engine start is permitted in response to the first response signal from the main mobile device 200. However, the doors are unlocked but the engine start is not permitted in response to the second response signal from the sub-mobile device 300. As such, when the sub-mobile device 300 is carried by a person such as a child who is incapable of driving the vehicle, the person who has the sub-mobile device 300 is capable of only getting in the vehicle before a person who has the main mobile device 200 arrives at the vehicle. Therefore, it can be prevented that the vehicle is improperly moved by the person who has only the sub-mobile device 300.

Also, according to this embodiment, when the doors are unlocked based on the second response signal from the sub-mobile device 300, the start-permitting detection area is limited to a narrow area that includes only the driver seat and the passenger seat but does not include the rear seats. For this reason, it is less likely that the engine or motor is erroneously started by the user who has only the sub-mobile device 300. Also, since the limited start-permitting detection area includes the driver seat and the front passenger seat, the engine start is permitted when a driver who has the main mobile device 200 seats on the driver seat when the driver is going to drive the vehicle.

Also, according to this embodiment, the number of doors that are unlocked by the sub-mobile device 300 is smaller than the number of doors that are unlocked by the main mobile device 200. Accordingly, it is less likely that the user who has only the sub-mobile device 300 opens the unnecessary door and unintentionally hits adjacent vehicles.

Also, according to this embodiment, the unlock-permitting switch when mobile device whose matching is confirmed is the sub-mobile device 300 is only a part of the unlock-permitting switch when the mobile device whose matching is confirmed is the main mobile device 200. Accordingly, for example, the unlock control cannot be conducted from the door unnecessary for the user who has only the sub-mobile device 300 such that the unlock control is not conducted by the operation of the unlock-permitting switch that is disposed on the entrance door for the driver seat, to thereby reduce the possibility that the user who has only the sub-mobile device 300 opens the unnecessary door.

The embodiment may be modified and changed in many other ways.

What is claimed is:

1. An in-vehicle device remote control system comprising:
a transmitter for transmitting a transmission request signal to given detection areas outside of and inside of a vehicle;
a mobile device carried by a user for transmitting a response signal in response to the transmission request signal of the transmitter;
a receiver for receiving the response signal of the mobile device;
matching means for executing a given matching process with respect to the response signal received by the receiver;
position determining means for determining a detection area in which the mobile device is present based on the response signal received by the receiver;
door control means for controlling doors of the vehicle based on the response signal matched by the matching means, and a position of the mobile device in the detection area outside of the vehicle; and
engine control means for controlling an engine of the vehicle based on the response signal matched by the matching means, and a position of the mobile device in a given start-permitting detection area inside the vehicle,
wherein the mobile device includes a first mobile device for transmitting a first response signal, and a second mobile device for transmitting a second response signal different from the first response signal,
wherein the door control means unlocks the doors automatically in response to any of the first response signal or the second response signal, and
wherein the engine control means permits a start of the engine in response to only the first response signal.

2. The in-vehicle device remote control system as in claim 1, wherein:
the start-permitting detection area is made narrower, when the door is unlocked in response to the second response signal, than that in a case of the first response signal.

3. The in-vehicle device remote control system as in claim 2, wherein:
the start-permitting detection area includes all of seats in the vehicle, when the door is unlocked in response to the first response signal; and
the start-permitting detection area includes only a driver seat and a front passenger seat in the vehicle, when the door is unlocked in response to the second response signal.

4. The in-vehicle device remote control system as in claim 1, wherein:
the start-permitting detection area is made narrower, when the second mobile device is detected in the detection area in the inside of the vehicle, than that in a case that the second mobile device is not detected in the detection area in the inside of the vehicle.

5. The in-vehicle device remote control system as in claim 4, wherein:
the start-permitting detection area includes all of seats in the vehicle, when the second mobile device is not detected in the detection area in the inside of the vehicle; and
the start-permitting detection area includes only a driver seat and a front passenger seat in the vehicle, when the second mobile device is detected in the detection area in the inside of the vehicle.

6. The in-vehicle device remote control system as in claim 1, wherein:
the door unlocked in response to the second response signal is only a part of the doors unlocked in response to the first response signal.

7. The in-vehicle device remote control system as in claim 6, wherein:
the doors to be unlocked in response to the first response signal are all unlocked in response to only the second response signal, when the first mobile device is detected as being present in any of the detection areas.

8. The in-vehicle device remote control system as in claim 1, wherein:
the door is unlocked in response to a user operation on an unlock-permitting switch of the doors under a condition that the response signal of the mobile device is received and the mobile device is detected as being present in the detection area outside of the vehicle; and
the unlock-permitting switch of the doors to be detected for door-unlocking control in a case of the second response signal is only a part of unlock-permitting switches of the doors in a case of the first response signal.

9. The in-vehicle device remote control system as in claim 8, wherein:
the unlock-permitting switches to be detected for door-unlocking control in response to the first response signal are all detected in response to only the second response signal, when the first mobile device is detected as being present in any of the detection areas.

10. The in-vehicle device remote control system as in claim 1, wherein:
at least one of controls of the door control means and the engine control means is changeable remotely by the first mobile device but unchangeable by the second mobile device.

11. The in-vehicle device remote control system as in claim 1, wherein:
only the first mobile device has a mechanical key that is engageable with a key cylinder of the door for manually unlocking the door, and a relay that receives an electric power from the radio waves of a given frequency transmitted from the transmitter disposed in the vicinity of an engine start switch so that the first response signal is transmitted from the first mobile device.

* * * * *